United States Patent
Jin et al.

(10) Patent No.: US 6,532,831 B2
(45) Date of Patent: Mar. 18, 2003

(54) ROTATION SENSOR (75) Inventors: Dongzhi Jin, Tokyo (JP); Fumihiko Abe, Tokyo (JP); Kengo Tanaka, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 10/010,578

(22) Filed: Nov. 8, 2001

(65) Prior Publication Data

US 2002/0043115 A1 Apr. 18, 2002

Related U.S. Application Data (63) Continuation of application No. PCT/JP01/01777, filed on Mar. 7, 2001.

(30) Foreign Application Priority Data

Mar. 9, 2000 (JP) ......................................... 2000-065258

(51) Int. Cl.[7] .............................. G01L 3/02; G01L 3/10
(52) U.S. Cl. ............................... 73/862.331; 73/862.335
(58) Field of Search ..................... 73/862.331, 862.332, 73/862.333, 862.335, 862.336, 862.193

(56) References Cited

U.S. PATENT DOCUMENTS

| | | | |
|---|---|---|---|
| 2,498,282 A | | 2/1950 | Langer |
| 4,881,414 A | * | 11/1989 | Setaka et al. .......... 324/207.18 |
| 4,907,460 A | * | 3/1990 | Taniguchi et al. ...... 73/862.331 |
| 4,972,725 A | * | 11/1990 | Choisnet ................ 73/862.337 |
| 5,046,372 A | * | 9/1991 | Taniguchi et al. ...... 73/862.335 |
| 5,083,468 A | | 1/1992 | Dobler et al. |
| 5,195,382 A | * | 3/1993 | Peilloud ..................... 324/209 |
| 5,578,767 A | * | 11/1996 | Chikaraishi et al. ... 73/862.331 |
| 5,637,997 A | * | 6/1997 | Hore et al. ............. 324/207.16 |
| 5,796,014 A | * | 8/1998 | Chikaraishi et al. ..... 73/862.28 |
| 2001/0004849 A1 | * | 6/2001 | Jin et al. ................ 73/862.331 |

FOREIGN PATENT DOCUMENTS

JP      2001-004314      6/1999

* cited by examiner

Primary Examiner—Max Noori
Assistant Examiner—Lilybett Martir
(74) Attorney, Agent, or Firm—Knobbe, Martens, Olson & Bear, LLP (57) ABSTRACT To provide a rotation sensor for detecting a relative rotation angle, which shows little variation in detection accuracy even in the presence of disturbances.

The rotation sensor detects a variation in impedance of each of two exciting coils (12b) which is produced depending on the strength of eddy currents induced in first and second rotors (11, 13), and determines a relative rotation angle on the basis of a difference between the amounts of both variations. A first conductive layer (11a) is provided on at least one of the opposite sides of the first rotor as viewed along a rotation axis, and consists of a plurality of portions arranged in a circumferential direction of the first rotor with predetermined spaces between. The stationary core (12) is so arranged that a core body (12a) holding the two exciting coils (12b) is symmetrical with respect to a plane normal to the rotation axis. A second conductive layer (13c) is provided on an outer circumferential surface of the second rotor (13) and consists of a plurality of portions arranged in a circumferential direction of the second rotor with spaces between, wherein the spaces between the portions of the second conductive layer (13c) correspond to the spaces between the portions of the first conductive layer (11a).

20 Claims, 10 Drawing Sheets

PRIOR ART

ROTATION SENSOR

RELATED APPLICATION

This Application is a continuation of and incorporates by reference, in its entirety, International Application No. PCT/JP01/01777, filed Mar. 7, 2001, published in Japanese.

1. Technical Field

The present invention relates to a rotation sensor for detecting a relative rotation angle between two relatively rotating members or a rotation angle.

2. Background Art

Figure 12:
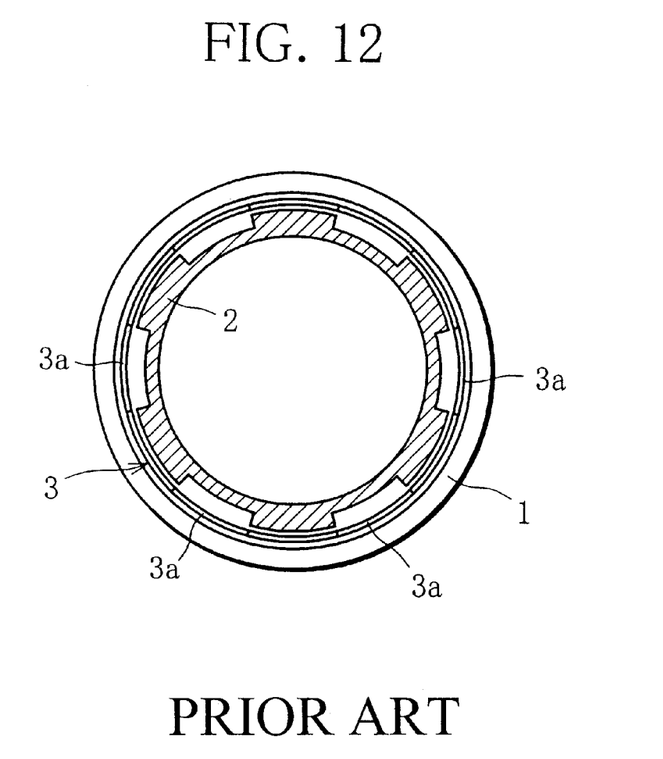
FIG. 12 is a cross-sectional plan view of a conventional rotation sensor that forms a background of the present invention.

As a rotation sensor for detecting a relative rotation angle between two relatively rotating members, a rotation sensor is known which, as shown in FIG. 12, comprises a stationary magnetic member 1 having an exciting coil, a magnetic rotor 2 having an indented outer circumference, and a metal rotor 3 with a plurality of metal teeth 3a placed between the stationary magnetic member 1 and the magnetic rotor 2 with predetermined spaces, and which is used, for example, for detecting torque acting on a steering shaft of an automobile.

Here, the exciting coil is electrically connected to an oscillation circuit and a signal detection circuit. When alternating current is supplied to the coil at a fixed frequency, an ac magnetic field is produced in a magnetic circuit formed around the coil. The sensor has the metal teeth 3a provided at equal spaces in the circumferential direction. As the rotors 2, 3 rotate relatively and the metal teeth 3a traverse the ac magnetic field, eddy currents are induced in the metal teeth 3a. The magnitude of the eddy currents varies depending on the relative rotation angle between the rotors 2 and 3. As the magnitude of the eddy currents varies, the impedance of the coil varies.

Thus, the sensor is designed to detect the variation in the impedance of the coil by the signal detection circuit, to thereby detect the relative rotation angle between the rotors 2, 3, namely, the two relatively rotating members.

The problem with the above-described conventional rotation sensor is that since the impedance of the coil varies due to disturbances such as variation in ambient temperature, electromagnetic noise, variation in the oscillation frequency of the oscillation circuit, power supply voltage, assembly error, etc., it is difficult to detect the relative rotation angle or the rotation angle accurately.

The present invention has been made in view of this problem. The object of the present invention is to provide a rotation sensor that shows little variation in detection accuracy even in the presence of disturbances and can detect the relative rotation angle or the rotation angle accurately.

DISCLOSURE OF THE INVENTION

In order to attain the above object, a first rotation sensor for detecting a relative rotation angle between first and second relatively rotating shafts according to the present invention comprises a first rotor having an insulating ferromagnetic layer and a first conductive layer, the first rotor being fixed to one of the first and second shafts at a predetermined position in an axial direction of the one of the first and second shafts; a stationary core having two exciting coils arranged in an axial direction of a rotation axis of the rotor with a predetermined space between, and a core body for holding the exciting coils, the stationary core being fixed to a stationary member; a second rotor having a second conductive layer, the second rotor being fixed to the other of the first and second shafts and arranged between the first rotor and the stationary core; and oscillation means for producing an oscillating signal of a particular frequency, the oscillation means being electrically connected to each of the exciting coils; wherein the rotation sensor further comprises variation detecting means for detecting a variation in impedance of each of the two exciting coils due to eddy currents induced in the first and second rotors; difference detecting means for detecting a difference in the detected amount of variation in impedance between the two exciting coils; and determining means for determining a relative rotation angle based on the detected difference; wherein the first conductive layer of the first rotor is provided on the insulating ferromagnetic layer, on at least one of the opposite sides of the first rotor as viewed in the axial direction of the rotation axis, and consists of a plurality of portions arranged in a circumferential direction of the first rotor with predetermined spaces between, the stationary core is so arranged that the core body holding the two exciting coils is symmetrical with respect to a plane normal to the rotation axis, and the second conductive layer of the second rotor is provided on an outer circumferential surface of the second rotor and consists of a plurality of portions arranged in a circumferential direction of the second rotor with spaces between, the spaces between the portions of the second conductive layer corresponding to the spaces between the portions of the first conductive layer.

In order to attain the above object, a second rotation sensor for detecting a rotation angle of a rotating shaft according to the present invention comprises a rotor having an insulating ferromagnetic layer and a first conductive layer provided to cover the insulating ferromagnetic layer in a range corresponding to a center angle of 180°, the rotor being fixed to the rotating shaft; a stationary core having two exciting coils arranged in an axial direction of a rotation axis of the rotor with a predetermined space between, a core body for holding the exciting coils, and a second conductive layer provided on at least one of the opposite sides of the stationary core as viewed in the axial direction of the rotation axis to cover at least one of the exciting coils and a corresponding portion of the core body in a range corresponding to a center angle of 180°, the stationary core being fixed to a stationary member in a manner that the core body holding the exciting cores is symmetrical with respect to a plane normal to the rotation axis; oscillation means for producing an oscillating signal of a particular frequency, the oscillation means being electrically connected to each of the exciting coils; variation detecting means for detecting a variation in impedance of each of the two exciting coils due to eddy currents induced in the rotor; difference detecting means for detecting a difference in the detected amount of variation in impedance between the two exciting coils; and determining means for determining a rotation angle based on the detected difference.

In order to attain the above object, a third rotation sensor according to the present invention has a structure such that the first rotation sensor and the second rotation sensor are combined together.

BEST MODE OF CARRYING OUT THE INVENTION

Embodiments of rotation sensor according to the present invention will be described in detail based on FIGS. 1 to 11.

First, as a first embodiment, a rotation sensor for detecting, for example, torque of a steering shaft that is transmitted from a driving shaft through a conversion joint (torsion bar) to a driven shaft in an automobile will be described based on FIGS. 1 to 5.

Figure 1:
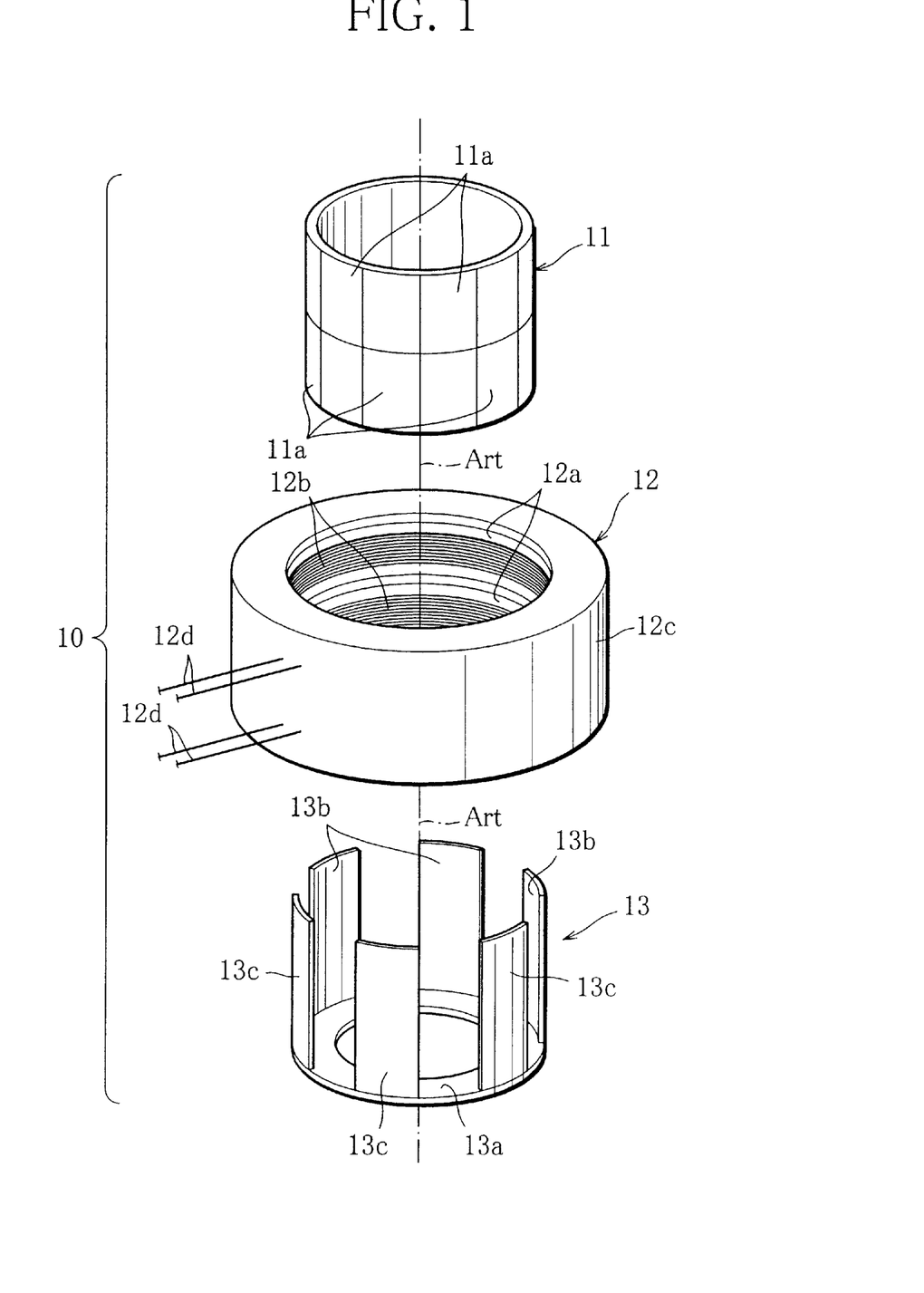
FIG. 1 is an exploded perspective view of a rotation sensor according to a first embodiment of the present invention.
Figure 2:
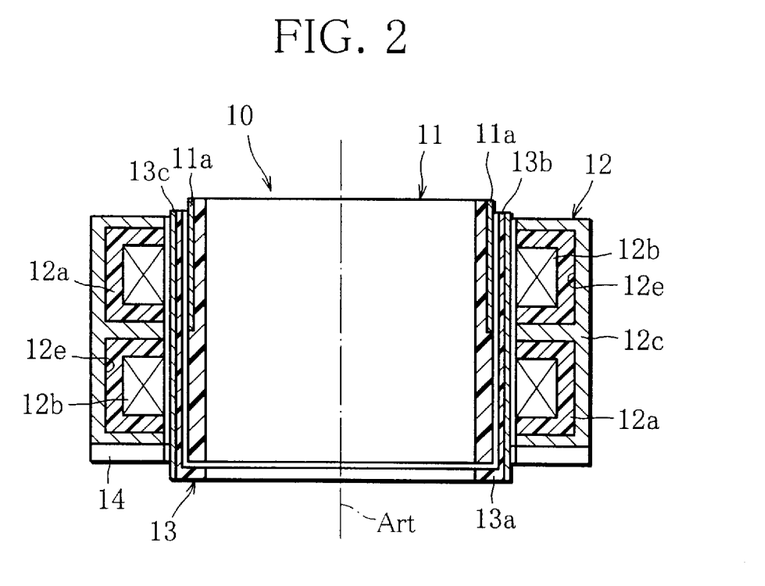
FIG. 2 is a cross-sectional view of the rotation sensor of FIG. 1 taken along a diameter thereof.

As shown in FIGS. 1 and 2, a rotation sensor 10 comprises a first rotor 11, a stationary core 12, a second rotor 13, and a relative-rotation-angle measurement device 14. Here, the driving shaft rotates relatively to the driven shaft within a range of ±8°.

The first rotor 11 is made of insulating ferromagnetic material that is a mixture of electrical-insulating thermoplastic synthetic resin such as nylon, polypropylene (PP), polyphenylenesulfide (PPS), ABS resin or the like and 10~70 volume % of soft magnetic powder of Ni—Zn ferrite or Mn—Zn ferrite, and has a cylindrical shape. The first rotor 11 is fixed to the rotating driving shaft at a predetermined position in the axial direction. As shown in FIG. 1, a plurality of copper sheets 11a are arranged on the outer circumferential surface of the first rotor 11, in two rows as viewed along the rotation axis Art. In each row, the copper sheets 11a are arranged in the circumferential direction with predetermined spaces between them, for example, spaces corresponding to center angles of 30°, and the copper sheets 11a in the upper row are made to correspond to the spaces in the lower row, respectively.

Here, it will do if the copper sheets 11a are arranged in at least one of the upper and lower parts of the outer circumferential surface of the first rotor as viewed along the rotation axis Art, having predetermined spaces between them as viewed in the circumferential direction. Specifically, the copper sheets 11a may be arranged only in the upper part or only in the lower part, with predetermined spaces between them. Alternatively, the copper sheets may be arranged in the upper or lower part with predetermined spaces between them, and in the lower or upper part over the entire circumference. For the sheets, material other than copper, for example, aluminum or silver may be used as long as the material can form a non-magnetic conductive layer. The sheets such as the copper sheets 11a may be embedded in the insulating ferromagnetic material to form a conductive layer. Alternatively, plates of such material that have been pressed may be used to form a conductive layer. In order to block a high-frequency magnetic field, the desirable thickness of the conductive layer is about 0.1 to 0.5 mm, taking account of magnetic reluctance that depends the space between the first rotor 11 and the stationary core 12 as viewed in the radial direction. The smaller the spaces between the copper sheets 11a are (namely, the smaller the center angles corresponding to the spaces are), the larger number of sheets the conductive layer consists of. Consequently, in the rotation sensor 10, variation in the total of eddy currents induced in the copper sheets 11a (which is in proportion to the number of sheets the conductive layer consists of) is larger, the sensitivity for detecting the relative rotation angle is higher, but the range of measurable relative rotation angles is narrower.

The stationary core 12 is arranged around the first rotor 11 with a small space of several mm or so as measured in the radial direction, and fixed to a stationary member (not shown) that is located near the steering shaft. As shown in FIG. 2, the stationary core 12 comprises two core bodies 12a made of the same insulating ferromagnetic material as the first rotor 11 is made of, exciting coils 12$b_1$, 12$b_2$ individually held in the core bodies 12a, and a shielding case (hereinafter referred to simply as "case") 12c for holding the two core bodies 12a. Each of the exciting coils 12$b_1$, 12$b_2$ is connected to a signal processing circuit (not shown) by drawing its wire 12d out of the case 12c (see FIG. 1), and supplied with alternating current from the signal processing circuit. The case 12c is made of metal that can block an ac magnetic field such as aluminum, copper, iron or the like, and has a ring-like shape with two hollows 12e for holding the core bodies 12a individually.

Here, the stationary core 12 is so arranged that the two core bodies 12a, respectively holding the exciting coils 12$b_1$, 12$b_2$, and the case 12c are symmetrical with respect to a plane normal to the rotation axis Art, as shown in FIG. 2. The directions of the magnetic circuits which the exciting coils 12$b_1$, 12$b_2$ form together with the first rotor 11 may be made opposite, by winding the two exciting coils 12b in opposite directions or by supplying alternating current to the two exciting coils 12b in opposite directions.

Figure 3:
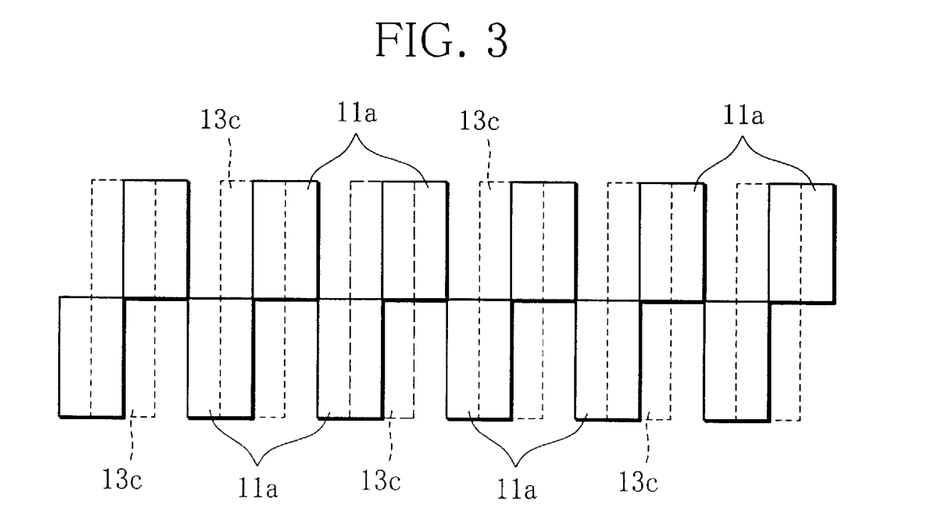
FIG. 3 is a development of a first rotor for showing the positional relationship between a first conductive layer formed on the first rotor and a second conductive layer formed on a second rotor.

The second rotor 13 is made of synthetic resin that has electrically insulating property and high formability. As shown in FIG. 1, the second rotor 13 comprises a flange 13a and a plurality of blades 13b that are distributed equally on the outer circumference of the flange 13a and extend parallel to the rotation axis Art. The blades 13b are arranged with spaces between them, which correspond to the spaces between the copper sheets 11a, and have copper sheets 13c on their outer surfaces. The copper sheets 11a on the first rotor 11, which are arranged in two rows in the vertical direction and with predetermined spaces between them in the circumferential direction, and the copper sheets 13a show positional relationship as shown in FIG. 3, where the first rotor 1 is shown in a developed state. The positional relation between the copper sheets 11a and the copper sheets 13c shown in FIG. 3 is the basic relative position in the relative rotation between the first and second rotors 11, 13, where the relative rotation is considered as zero.

The second rotor 13 may be made of insulating material and cylindrical in shape, and the second rotor 13 may have, on the inner surfaces of the blades 13b or on the inner circumferential surface of the cylindrical body or in the cylindrical body, a conductive layer of a predetermined thickness (for example, a layer consisting of 0.2 mm copper sheets, or a layer of aluminum, silver or the like) that consists of portions distributed equally, in a manner corresponding to the copper sheets 11b. Alternatively, the entire second rotor 13 may be made of metal. This applies also to the other embodiments of rotation sensor described later. The second rotor 13 is arranged between the first rotor 11 and the stationary core 12 and fixed to the driven shaft that rotates relatively to the driving shaft.

The rotation sensor 10 having the above structure is incorporated in the steering device, where the first rotor 11 is fixed to the driving shaft, the second rotor 13 is fixed to the driven shaft, and the stationary core 12 is fixed to the stationary member.

Figure 4:
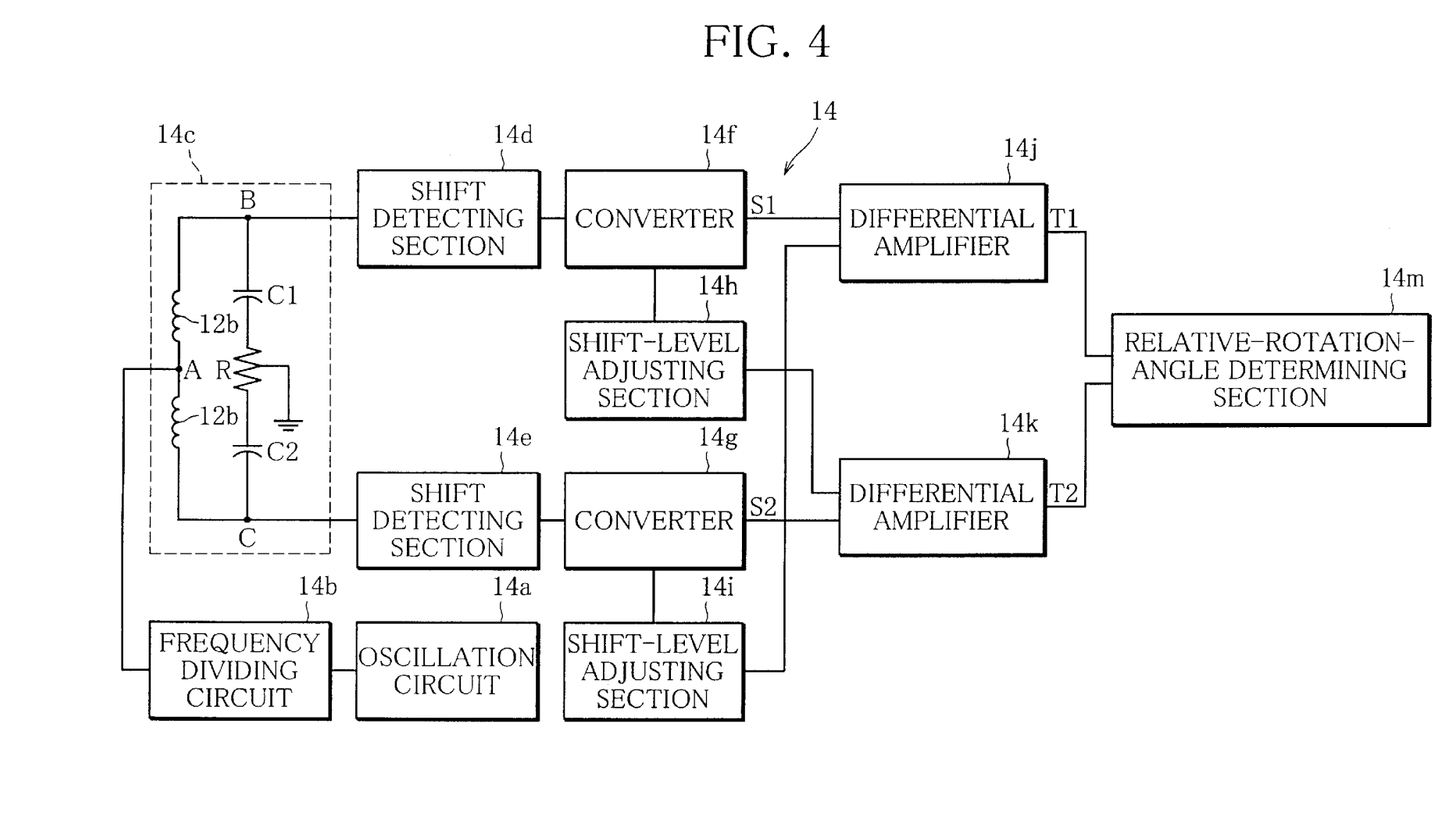
FIG. 4 is a circuit diagram showing an example of a relative-rotation-angle measurement device used in the rotation sensor shown in FIG. 1.

Next, referring to FIGS. 4 and 5, how the rotation sensor according to the first embodiment measures the relative rotation angle will be described. FIG. 4 is a circuit diagram showing an example of a relative-rotation-angle measurement device 14 in the rotation sensor. In FIG. 4, the measurement device 14 forms oscillation means. The measurement device 14 comprises an oscillation circuit 14a for producing an oscillating signal, a frequency dividing circuit 14b for dividing the oscillating signal to thereby send out a pulse signal of a particular frequency, a phase shifting section 14c for shifting the phase of the pulse signal depending on each of the exciting coils $12b_1$, $12b_2$, which forms phase shift means, first and second shift detecting sections 14d, 14e for each detecting the amount of the produced phase shift, which form shift detecting means (variation detecting means), first and second converters 14f, 14g for each converting the detected amount of phase shift into a corresponding voltage, first and second shift-level adjusting sections 14h, 14i for each adjusting a shift-level for the voltage, a first differential amplifier 14j for obtaining a difference between the voltage supplied from the first converter 14f, which corresponds to the amount of phase shift, and the adjusted voltage supplied from the second shift-level adjusting section 14i, which forms first differences-in-amount-of-shift detecting means, a second differential amplifier 14k for obtaining a difference between the voltage supplied from the second converter 14g, which corresponds to the amount of phase shift, and the adjusted voltage supplied from the first shift-level adjusting section 14h, which forms second difference-in-amount-of-shift detecting means, and a relative-rotation-angle determining section 14m for determining a relative rotation angle based on the obtained differences in voltage, which forms determining means.

The oscillation circuit 14a supplies a pulse signal of a particular frequency through the frequency dividing circuit 14b to the phase shifting section 14c.

The phase shifting section 14c comprises, as shown in FIG. 4, the aforementioned exciting coil $12b_1$, connected in series between points A and B, the exciting coil $12b_2$ connected in series between points A and C, and a capacitor C1, resistors R1, R2 and a capacitor C2 connected in series between points B and C, thus constituting two phase shifting circuits. The exciting coils $12b_1$, $12b_2$ are wound on the stationary core 12 to produce ac magnetic field in the vicinity thereof when supplied with ac exciting current, and constitute magnetic circuits in cooperation with the stationary core 12 and the first rotor 11. The phase shifting section 14c shifts the phase of the pulse signal input from the frequency dividing circuit 14b connected to the exciting coils $12b_1$, $12b_2$, in accordance with the magnitudes of eddy currents induced in the second rotor 13 and in the copper sheets 11a of the first rotor 11.

The first and second shift detecting sections 14d, 14e are connected to points B and C, respectively, of the phase shifting section 14c, as shown in FIG. 4. The first shift detecting section 14d detects the amount of phase shift of the pulse signal produced between points A and B. The second shift detecting section 14d detects the amount of phase shift of the pulse signal produced between points A and C.

Figure 5:
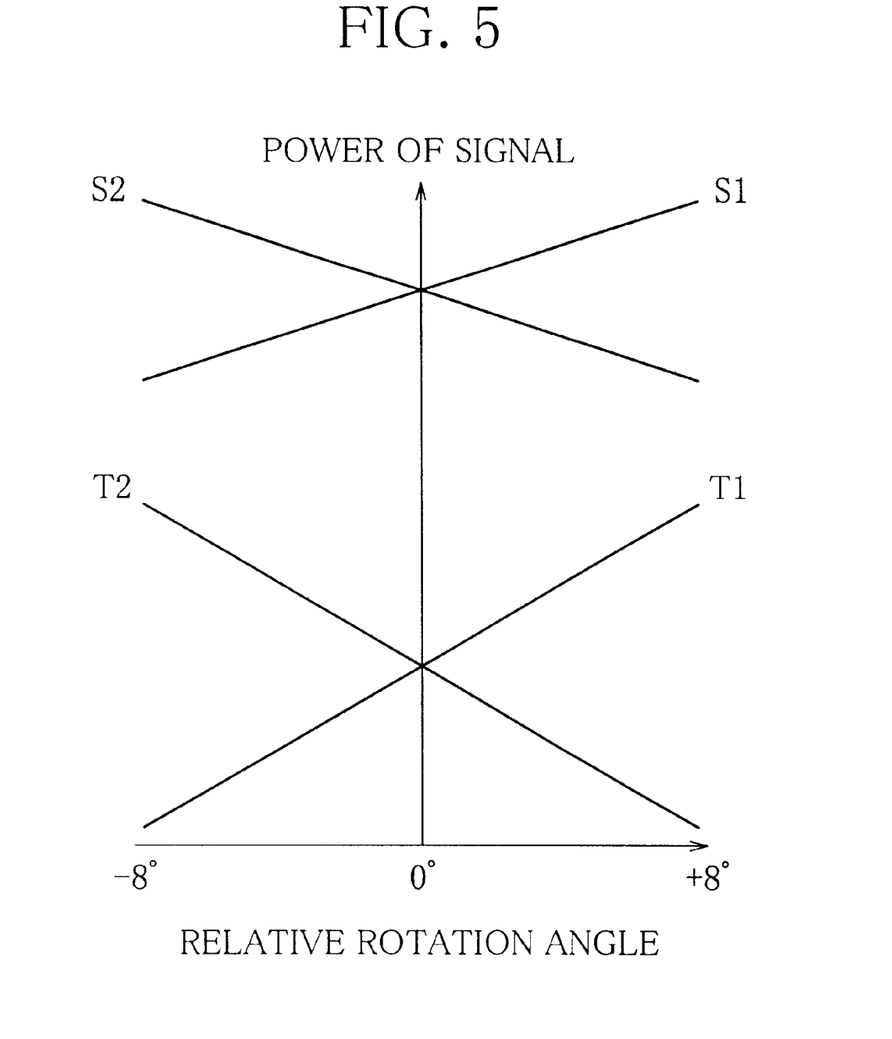
FIG. 5 is a voltage-characteristic diagram showing the relationship among voltages S1, S2, signals T1, T2, and the relative rotation angle between the first and second rotors.

As shown in FIG. 5, the first and second converters 14f, 14g convert the detected amounts of phase shift into corresponding voltages S1, S2, respectively. As is apparent from FIG. 3, when the first and second rotors 11, 13 rotate relatively, the total area of regions where the copper sheets 11a and copper sheets 13c block magnetic flux produced by the upper exciting coil $12b_1$, and the total area of regions where the copper sheets 11a and copper sheets 13c block magnetic flux produced by the lower exciting coil $12b_2$ vary in opposite directions. Therefore, the inclinations are opposite as shown in FIG. 5.

The shift-level adjusting sections 14h, 14i adjust shift-levels for the voltage-level signals S1, S2 supplied from the converters 14f, 14g, and supply signals of adjusted voltages to the first and second differential amplifiers 14j, 14k, respectively. The first differential amplifier 14j obtains a difference T1 between the voltage-level signal S1 supplied from the converter 14f and the signal supplied from the shift-level adjusting section 14i, and supplies the obtained difference T1 to the relative-rotation-angle determining section 14m. The second differential amplifier 14k obtains a difference T2 between the voltage-level signal S2 supplied from the converter 14g and the signal supplied from the shift-level adjusting section 14h, and supplies the obtained difference T2 to the relative-rotation-angle determining section 14m. Here, since the inclinations of the voltage-level signals S1, S2 are opposite, the inclinations of the differences T1, T2 are twice as large as the inclinations of the voltage-level signals S1, S2, respectively.

As indicated in FIG. 4, the relative-rotation-angle determining section 14m determines the relative rotation angle between the two rotors, based on the voltages of the signals T1, T2, with high accuracy, within a range of −8° to +8°.

From the obtained relative rotation angle, the rotation sensor 10 can obtain acting torque, based on beforehand-obtained relationship between torque acting between the driving shaft and the driven shaft and relative rotation angle between the two shafts.

In the present embodiment, in order to increase the measurement accuracy, the relative rotation angle between the rotors is obtained within a range of −8° to +8°, based on the voltages of the signals T1, T2. However, the present invention is not limited to this. For example, the relative rotation angle may be obtained, based on the voltage of one of the signals T1, T2.

In the rotation sensor 10, as shown in FIG. 2, the two core bodies 12a that hold the exciting coils $12b_1$, $12b_2$, and the case 12c are arranged to be symmetrical with respect to a plane normal to the rotation axis Art. Therefore, in the rotation sensor 10, in the measurement of the relative rotation angle by the relative-rotation-angle measurement device 14, disturbances affecting the exciting coils $12b_1$, $12b_2$, such as variation in ambient temperature, electromagnetic noise, variation in the oscillation frequency of the oscillation circuit, the power source voltage, assembly error, etc. are canceled out. The directions of the magnetic circuits which the two exciting coils 12b form together with the first rotor 11 may be made opposite by winding the exciting coils $12b_1$, $12b_2$ in opposite directions or by supplying alternating current to the two exciting coils 12b in opposite directions.

Thus, the signals T1, T2 are derived based on the respective differences of the voltage-level signals S1, S2 and cancel out the influences of disturbances mentioned above. Accordingly, the rotation sensor 10 shows only small variation in the detection accuracy even if subjected to various disturbances and can detect the relative rotation angle and thus the torque with accuracy. This applies also to below-described rotation sensors 20 and 30.

Next, as a second embodiment, a rotation sensor for detecting, for example, a rotation angle between a driving shaft and a driven shaft of a steering shaft of an automobile, wherein the driving shaft and the driven shaft are arranged side by side in the axial direction with a conversion joint (torsion bar) between, will be described based on FIGS. 6 to 9.

Figure 6:
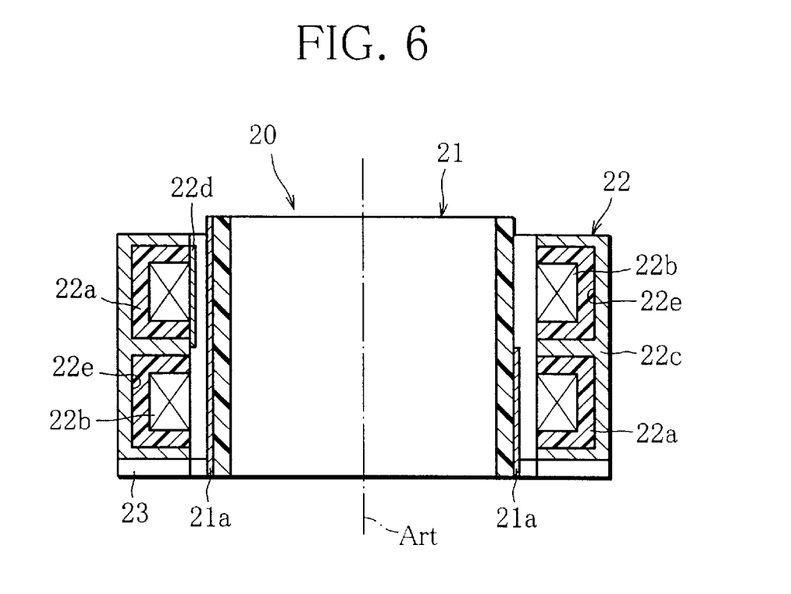
FIG. 6 is a cross-sectional elevation view of a rotation sensor according to a second embodiment of the present invention.

As shown in FIG. 6, a rotation sensor 20 comprises a rotor 21, a stationary core 22 and a rotation-angle measurement device 23.

The rotor 21 is fixed to a steering shaft. The rotor 21 is made of the same insulating ferromagnetic material as the first rotor 11 of the rotation sensor 10 is made of, and cylindrical in shape. A copper sheet 21a is provided to cover the upper part of the outer circumferential surface of the rotor 21 as viewed along a rotation axis Art, in a range corresponding to a center angle of 180°, and to cover the lower part thereof over the entire circumference.

Here, it will do if a copper sheet 21a is provided at least in a range corresponding to a center angle of 180° as viewed in the direction of rotation. This also applies to a copper sheet 31g of a rotation sensor 30. As in the rotation sensor 10, another material such as aluminum, silver or the like may be used in place of the copper sheet 21a, as long as the material can form a conductive layer. A sheet such as the copper sheet 21a may be embedded in the insulating ferromagnetic material to form a conductive layer. Alternatively, a thin plate of such material that has been pressed may be used.

Figure 7:
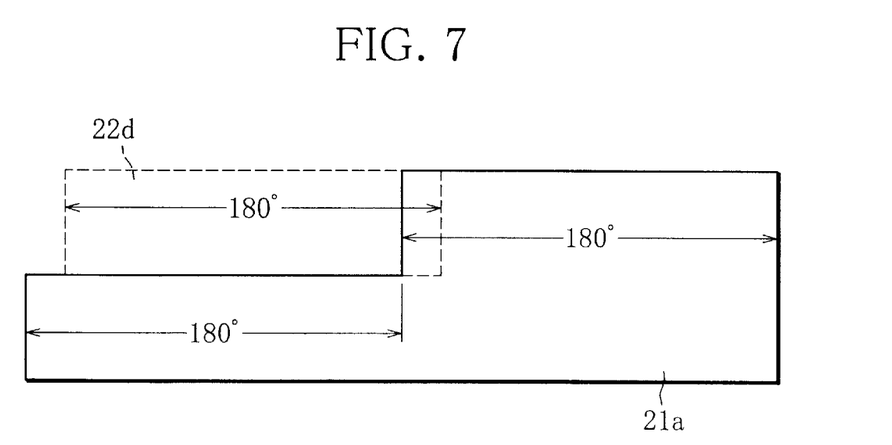
FIG. 7 is a development of the rotation sensor shown in FIG. 6 for showing the positional relationship between a first conductive layer formed on a rotor and a second conductive layer formed on a stationary core.

The stationary core 22 is arranged around the rotor 21 with a small space of several mm or so as measured in the radial direction, and fixed to a stationary member (not shown) that is located near the steering shaft. As shown in FIG. 6, the stationary core 22 comprises two core bodies 22a arranged along the rotation axis Art with a predetermined space between, exciting coils $22b_1$, $22b_2$ individually held in the core bodies 22a, and a shielding case (hereinafter referred to simply as "case") 22c for holding the two core bodies 22a. Each of the exciting coils $22b_1$, $22b_2$ is connected to a signal processing circuit (not shown) by drawing its wire (not shown) out of the case 22c, and supplied with alternating current from the signal processing circuit. As shown in FIG. 6, a copper sheet 22d is provided to cover the inner circumferential surfaces of the upper core body 22a and the upper exciting coil $22b_1$, in a range corresponding to a center angle of 180°. Therefore, the copper sheet 21a on the rotor 21 and the copper sheet 22d on the stationary core 22 show positional relationship as shown in FIG. 7, where the copper sheets 21a, 22d are shown in a developed state.

In the rotation sensor 20, the position where the copper sheets 21a and 22d overlap in a range corresponding to a center angle of 90° is defined as a position where the rotation angle of the rotor 21 is zero. The lower part of the copper sheet 21a is provided to cover the entire circumference. Therefore, as the rotor 21 rotates, the area of a region where the upper part of the copper sheet 21a and the copper sheet 22d overlap varies depending on the rotation angle, but the area of a region where the lower part of the copper sheet 21a and the copper sheet 22d overlap does not vary. Therefore, as the rotor 21 rotates, the impedance of the upper exciting coil $22b_1$, varies, but the impedance of the lower exciting coil $22b_2$ does not vary. Here, in addition to the copper sheet 22d provided in the upper part of the inner circumferential surface of the stationary core, another copper sheet may be provided in the lower part thereof in the same way but 180° in central angle apart from the copper sheet 22d in the upper part. This also applies to a copper sheet 32k of a rotation sensor 30 that will be described later.

The case 22c is made of metal that can block an ac magnetic field such as aluminum, copper, iron or the like, and has a ring-like shape with two hollows 22e for holding the core bodies 22a individually. Here, the stationary core 22 is, as shown in FIG. 6, so arranged that the two core bodies 22a, respectively holding the exciting coils $12b_1$, $22b_2$, and the case 22c are symmetrical with respect to a plane normal to the rotation axis Art. The directions of the magnetic circuits which the exciting coils $22b_1$, $22b_2$ form together with the first rotor 11 may be made opposite, by winding the exciting coils $22b_1$, $22b_2$ in opposite directions or by supplying alternating current to the exciting coils $22b_1$, $22b_2$ in opposite directions.

The rotation sensor 20 having the above structure is incorporated in the steering device, where the rotor 21 is fixed to the steering shaft and the stationary core 12 is fixed to the stationary member as mentioned above.

Figure 8:
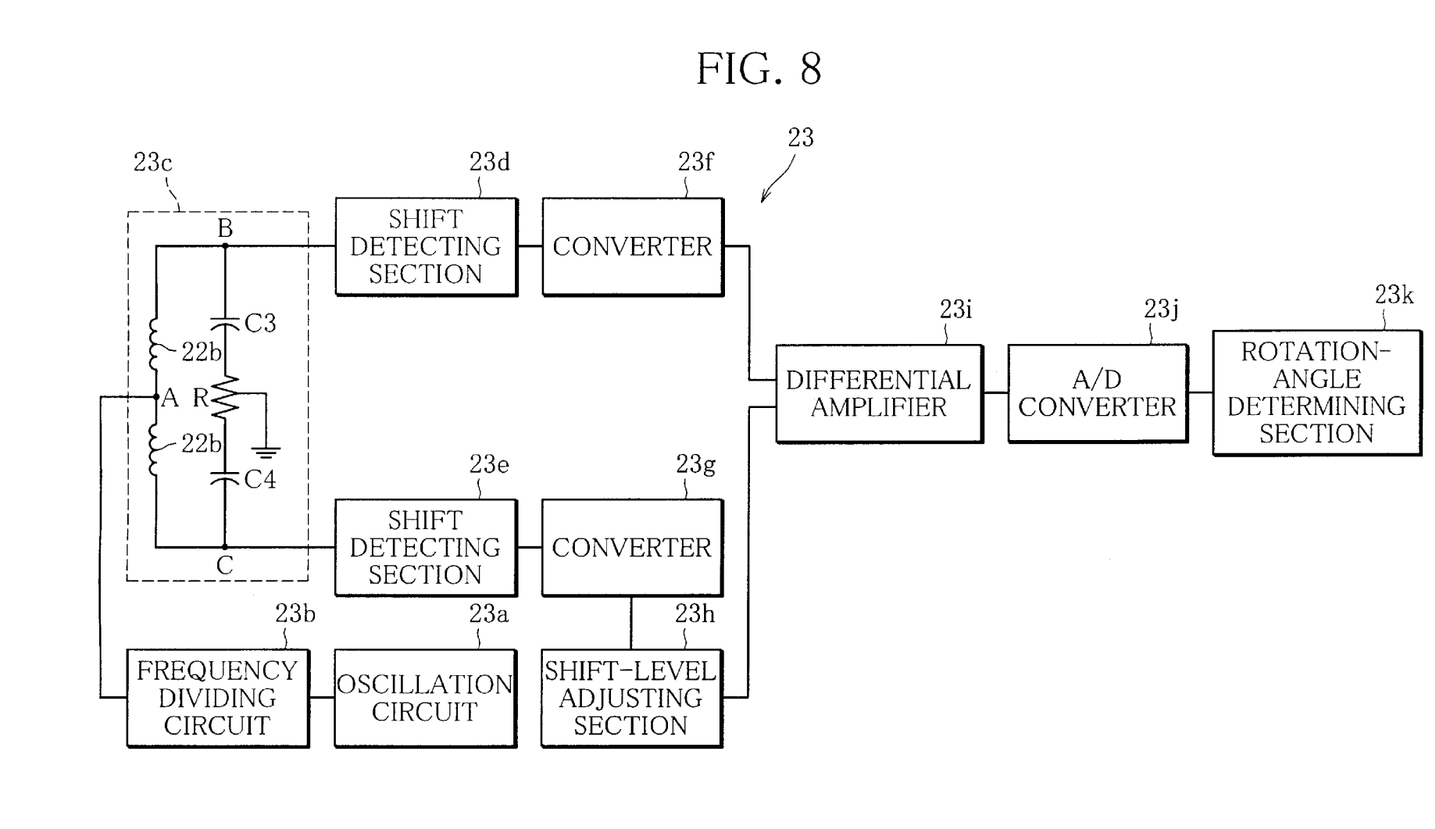
FIG. 8 is a circuit diagram showing an example of a rotation-angle measurement device used in the rotation sensor shown in FIG. 6.

Next, referring to FIGS. 8 and 9, how the rotation sensor 20 according to the second embodiment measures the rotation angle will be described. FIG. 8 is a circuit diagram showing an example of a rotation angle measurement device 23 in the rotation sensor. Here, the measurement device 23 forms oscillation means.

The measurement device 23 comprises an oscillation circuit 23a for producing an oscillating signal, a frequency dividing circuit 23b for dividing the oscillating signal to thereby send out a pulse signal of a particular frequency, a phase shifting section 23c for shifting the phase of the oscillating signal depending on each of the two exciting coils, which forms phase shift means, first and second shift detecting sections 23d, 23e for each detecting the amount of the produced phase shift, which form shift detecting means (variation detecting means), first and second converters 23f, 23g for each converting the detected amount of phase shift into a corresponding voltage, a shift-level adjusting section 23h for adjusting a shift-level for the voltage supplied from the converter 23g, a differential amplifier 23i for obtaining a difference between the voltage supplied from the first converter 23f, which corresponds to the amount of phase shift, and the adjusted voltage supplied from the shift-level adjusting section 23h, which forms difference-in-amount-of-shift detecting means, an A/D converter 23j for converting the obtained difference into digital data, and a rotation angle determining section 23k for determining a rotation angle of the rotor 21 based on the obtained difference, which forms rotation angle determining means.

The oscillation circuit 23a supplies a pulse signal of a particular frequency through the frequency dividing circuit 23b to the phase shifting section 23c.

The phase shifting section 23c comprises, as shown in FIG. 8, the aforementioned exciting coil $22b_1$, connected in series between points A and B, the exciting coil $22b_2$ connected in series between points A and C, and a capacitor C3, resistors R3, R4 and a capacitor C4 connected in series between points B and C, thus constituting two phase shifting circuits. The exciting coils $22b_1$, $22b_2$ are wound on the stationary core 22 to produce ac magnetic field in the vicinity thereof when supplied with ac exciting current, and form magnetic circuits in cooperation with the stationary core 22 and the rotor 21. The phase shifting section 23c shifts the phase of the pulse signal input from the frequency dividing circuit 23b connected to the exciting coils $22b_1$, $22b_2$, in accordance with the magnitude of eddy current induced in the copper sheet 21a of the rotor 21.

The first and second shift detecting sections 23d, 23e are connected to points B and C, respectively, of the phase shifting section 23c, as shown in FIG. 8. The first shift detecting sections 23d detects the amount of phase shift of the pulse signal produced between points A and B. The second shift detecting section 23d detects the amount of phase shift of the pulse signal produced between points A and C.

Figure 9:
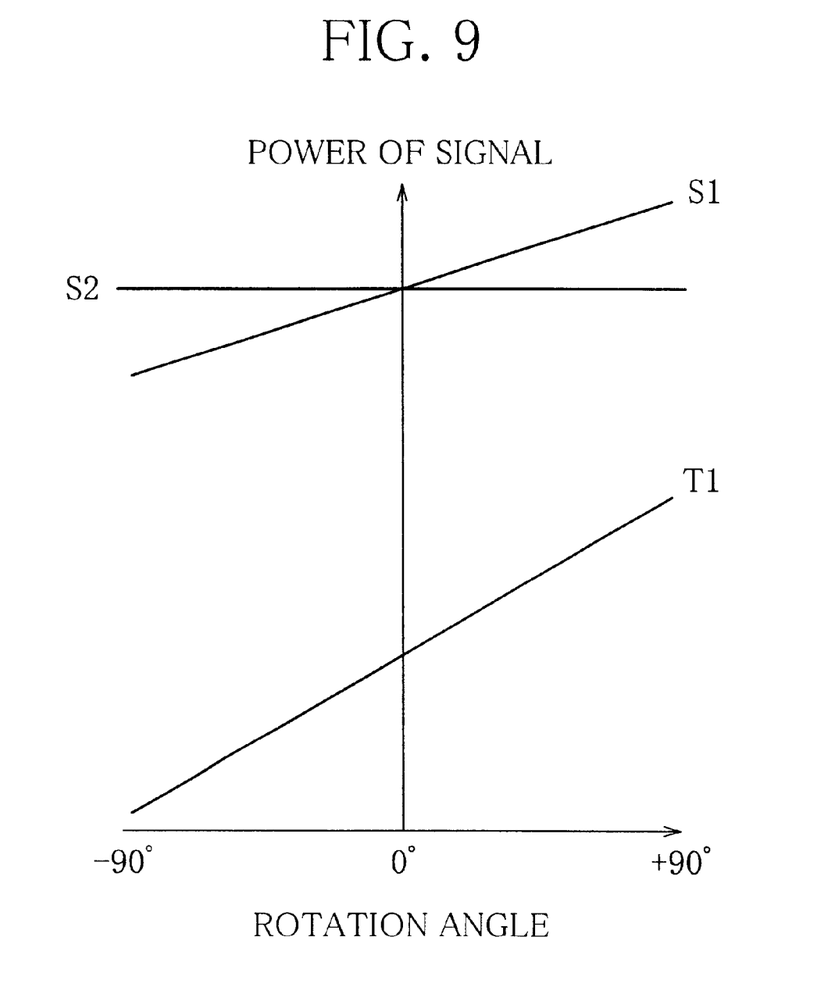
FIG. 9 is a voltage-characteristic diagram showing the relationship between voltages S1, S2 detected by the rotation-angle measurement device corresponding to the circuit diagram of FIG. 8, a signal T1, and the rotation angle of the rotor.

As shown in FIG. 9, the first and second converters 23f, 23g convert the detected amounts of phase shift into corresponding voltages S1, S2, respectively. Here, as the rotor 21 rotates, the voltage S1 varies but the voltage S2 does not vary. The shift-level adjusting section 23h adjusts a shift-level for the voltage S2 of the pulse signal supplied from the converter 23g, and supplies a signal of the adjusted voltage to the differential amplifier 23i. The differential amplifier 23i obtains a difference between the voltage S1 of the pulse signal supplied from the converter 23f and the voltage S2 of the pulse signal supplied from the shift-level adjusting section 23h, and supplies the obtained difference as a signal T1 (voltage) to the rotation angle determining section 23k through the A/D converter 23j.

As shown in FIG. 9, the rotation angle determining section 23k can determine the rotation angle of the rotor, based on the voltage of the signal T1, with high accuracy, within a range of −90° to +90°. Based on the obtained rotation angle, the rotation angle of the steering shaft can be obtained.

The present embodiment is designed to measure the rotation angle of the rotor based on the voltage of the signal T1, within a range of −90° to +90°. However, the present invention is not limited to this. For example, it is also possible to provide another shift-level adjusting section for adjusting a shift-level for the voltage of the pulse signal supplied from the converter 23f so that the rotation angle may be determined based on two signals, namely, the signal T1 and a signal indicative of a difference between the voltage supplied from this level-shift adjusting section and the voltage of the pulse signal supplied from the converter 23g. In that case, the accuracy in measuring the rotation angle can be increased.

Next, as a third embodiment, a rotation sensor wherein the rotation sensor for detecting the relative rotation angle of the steering shaft and the rotation sensor for detecting the rotation angle of the steering shaft as described above are combined together so that both the torque and the rotation angle can be detected will be described based on FIGS. 10 and 11.

Figure 10:
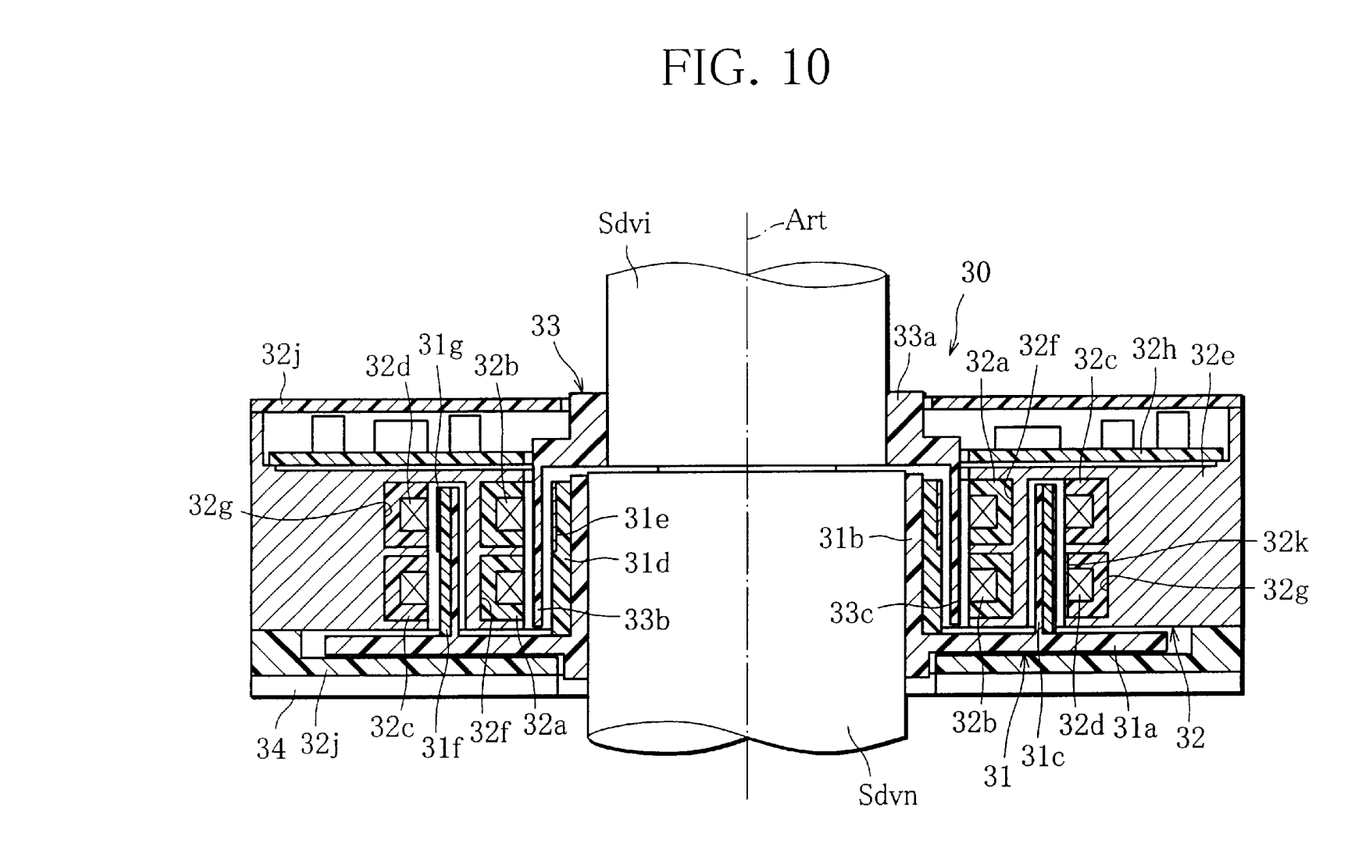
FIG. 10 is a cross-sectional elevation view of a rotation sensor according to a third embodiment of the present invention.

As shown in FIG. 10, a rotation sensor 30 comprises a first rotor 31, a stationary core 32, a second rotor 33, and an angle measurement device 34.

The first rotor 31 is fixed to a driven shaft Sdvn of a steering shaft, and comprises a base 31a, and two shaft portions 31b, 31c of different diameters that project from the base 31a. A plurality of first copper sheets 31e are provided on the outer circumferential surface of the shaft portion 31b with a first insulating ferromagnetic layer 31d between. As in the case of the first rotor 11 of the rotation sensor 10, the first copper sheets 31e are arranged in two rows, namely, upper and lower rows as viewed along the rotation axis Art. In each row, the first copper sheets 31e are arranged in the circumferential direction with predetermined spaces between them, for example, six copper sheets 31e are arranged with spaces corresponding to center angles of 30° between, and the copper sheets 31e in the upper row are made to correspond to the spaces in the lower row, respectively. The shaft portion 31c is formed outside the shaft portion 31b as viewed in the radial direction. A second copper sheet 31g is provided on the outer circumferential surface of the shaft portion 31c with a second insulating ferromagentic layer 31f between. The second copper sheet 31g is provided to cover the lower part of the outer circumferential surface of the shaft portion 31c in a range corresponding to a center angle of 180° and to cover the upper part thereof over the entire circumference, as viewed along the rotation axis Art.

Here, it will do if a second copper sheet 31g is provided to cover at least one of the upper and lower parts of the outer circumferential surface of the shaft portion 31c as viewed along the rotation axis, in a range corresponding to a center angle of 180°. The first and second insulating ferromagnetic layers 31d, 31f are made of the same material as the rotor 11 of the rotation sensor 10 is made of, and provided cylindrically. As in the case of the rotation sensor 10, instead of the first and second copper sheets 31e and 31g, sheets of another material such as aluminum or silver may be used as long as the material can form conductive layers. The sheets such as the first and second copper sheets 31e and 31g may be embedded in the insulating ferromagnetic material to form conductive layers. Instead of sheets, plates of such material that have been pressed may be used to form conductive layers.

The stationary core 32 is arranged around the first rotor 31 with a small space of several mm or so as measured in the radial direction, and fixed to a stationary member (not shown) that is located near the steering shaft. As shown in FIG. 10, the stationary core 32 comprises two first core bodies 32a, first exciting coils $32b_1$, $32b_2$ individually held in the first core bodies 32a, two second core bodies 32c, second exciting coils $32d_1$, $32d_2$ individually held in the second core bodies 32c, and a shielding case (hereinafter referred to simply as "case") 32e for holding the first and second core bodies 32a and 32c. Here, the first core bodies 32a are arranged inside the second core bodies 32c as viewed in the radial direction. As shown in FIG. 10, a copper sheet 32k is provided to cover the inner circumferential surfaces of the lower second core body 32c and the lower second exciting coil $32d_2$, in a range corresponding to a center angle of 180°.

Here, each of the first and second exciting coils $32b_1$, $32b_2$; $32d_1$, $32d_2$ is connected to a signal processing circuit (not shown) by drawing its wire out of the case 32e, and supplied with alternating current from the signal processing circuit. The case 32c is made of metal that can block an ac magnetic field such as aluminum, copper, iron or the like. The case 32e has hollows 32f for holding the first core bodies 32a and hollows 32g for holding the second core bodies 32c, which are located at different positions as viewed in the radial direction. The first core bodies 32a are located inside the second core bodies 32c as viewed in the radial direction.

As shown in FIG. 10, the stationary core 32 is so arranged that the two first core bodies 32a, the two second core bodies 32c, and the case 32e are symmetrical with respect to a plane normal to the rotation axis Art. The directions of the magnetic circuits which the first exciting coils $32b_1$, $32b_2$ form together with the first insulating ferromagnetic layer 31d of the first rotor 31 are made opposite, by winding the first exciting coils $32b_1$, $32b_2$ in opposite directions or by supplying alternating current to the first exciting coils $32b_1$, $32b_2$ in opposite directions. Also, the directions of the magnetic circuits which the second exciting coils $32d_1$, $32d_2$ form together with the second insulating ferromagnetic layer 31f of the first rotor 31 are made opposite, in the same way. Here, as shown in FIG. 10, a printed board 32h with a variety of electric components on is placed on the stationary core 32, and covers 32j of synthetic resin are provided at the top and the bottom of the stationary core 32.

The second rotor 33 is made of synthetic resin that has electrically insulating property and high formability. As shown in FIG. 10, the second rotor 33 comprises a cylindrical base portion 33a that is fixed to the driving shaft Sdvi, and six blades 33b that are distributed equally on the outer circumference of the base portion 33a and extend parallel to the rotation axis Art. The blades 33b are arranged with spaces between them so as to correspond to the copper sheets 31e of the first rotor 31, and have copper sheets 33c on their outer surfaces. The second rotor 33 may be made of insulating material and cylindrical in shape, and the second rotor 33 may have, on the inner surfaces of the blades 33b or on the inner circumferential surface of the cylindrical body or in the cylindrical body, a conductive layer of a predetermined thickness (for example, a layer consisting of 0.2 mm copper sheets, or a layer of aluminum, silver or the like) that consists of portions distributed equally, in a manner corresponding to the first copper sheets 31e.

Figure 11:
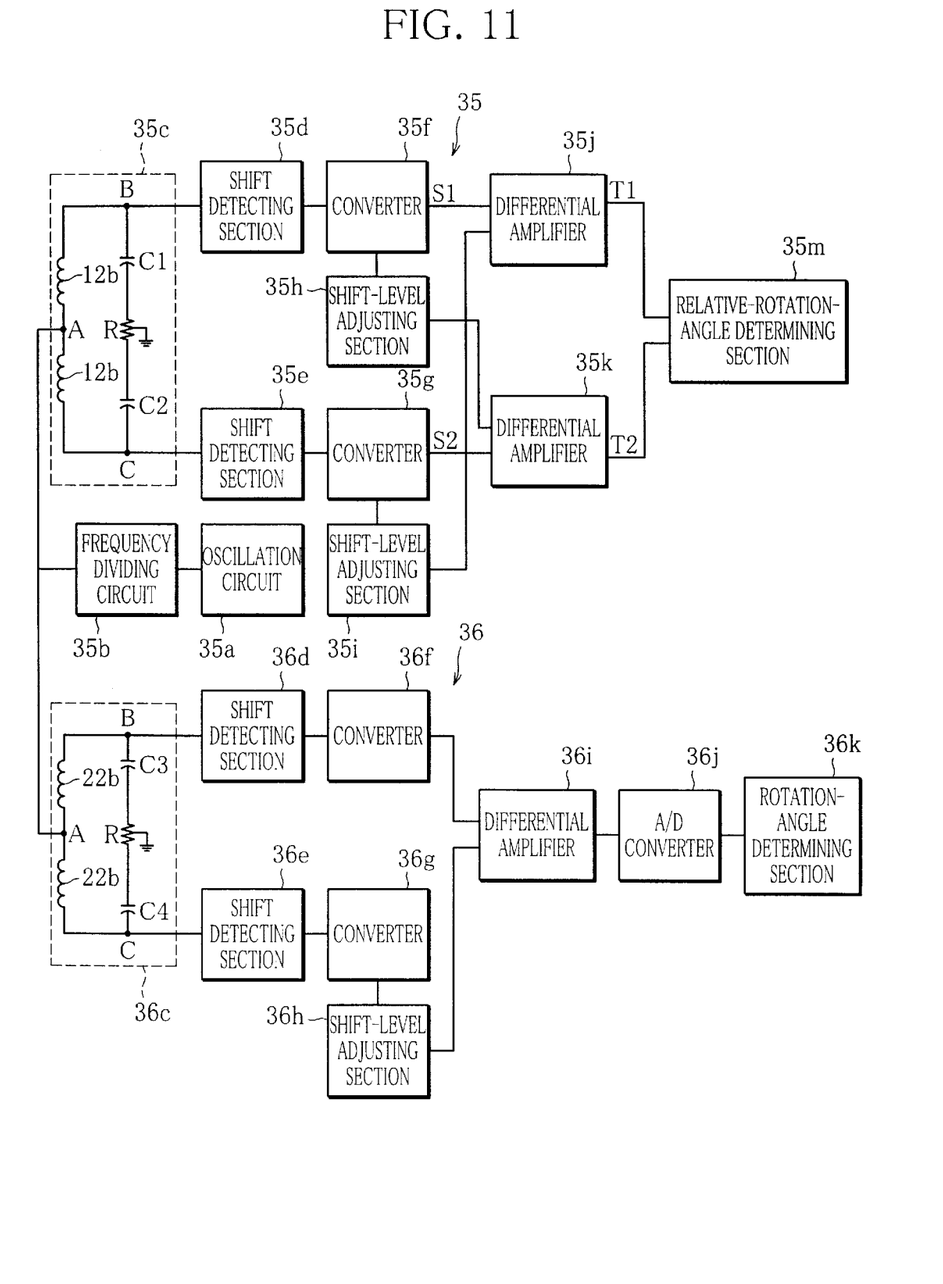
FIG. 11 is a circuit diagram of an example of a relative-rotation-angle and rotation-angle measurement device.

As shown in FIG. 11, the angle measurement device 34 comprises a relative-rotation-angle measurement device 35 and a rotation-angle measurement device 36, which are the same as the relative-rotation-angle measurement device 14 of the rotation sensor 10 and the rotation-angle measurement device 23 of the rotation sensor 20, respectively. Therefore, in FIG. 11, the components corresponding to the components of the relative-rotation-angle measurement device 14 and the rotation-angle measurement device 23 are denoted by corresponding reference signs, and a detailed description of the angle measurement device 34 will be omitted.

The rotation sensor 30 having the above structure is incorporated in the steering device of an automobile, where the first rotor 31 is fixed to the driven shaft Sdvn of the steering shaft, and the second rotor 33 is fixed to the driving shaft Sdvi. Thus, the relative rotation angle (torque) and the rotation angle can be detected in the same way as described above, by a single sensor.

As the embodiments of the present invention, the rotation sensors 10, 20, 30 used in the steering device of an automobile were described. However, a rotation sensor according to the present invention can be used for anything that needs to obtain a relative rotation angle between relatively rotating shafts such as robot arms, a rotation angle, and/or torque.

The rotation sensor 20 was designed to detect a rotation angle within a range of −90° to 90°. However, if an absolute rotational position sensor is added, the detectable range can be enlarged to be −180° to 180°.

In the rotation sensor 10, the first rotor 11 and the second rotor 13 were fixed to the driving shaft and driven shaft of the steering shaft, respectively, and in the rotation sensor 30, the first rotor 31 and the second rotor 33 were fixed to the driven shaft Sdvn and driving shaft Sdvi of the steering shaft, respectively. However, they may be fixed in the opposite way. Further, in the stationary core 32 of the rotation sensor 30, the first core bodies 32a were arranged inside the second core bodies 32c as viewed in the radial direction. However, they may be arranged in the opposite way, namely, the first core bodies 32a may be arranged outside the second core bodies 32c.

Needless to say, the two core bodies for holding the exciting coils may be formed as one body.

As variation detecting means, an example that detects an amount of phase shift of the oscillating signal was described. However, the variation detecting means is not limited to this. For example, the variation detecting means may be designed to detect variation in the effective level of the signal, variation in the amplitude of the signal or variation in the oscillation frequency of the signal.

Industrial Applicability

According to the first to third aspects of the present invention, a rotation sensor that shows little variation in detection accuracy even in the presence of disturbances and can detect the relative rotation angle or the rotation angle accurately can be provided.

What is claimed is:

1. A rotation sensor for detecting a relative rotation angle between first and second relatively rotating shafts, comprising:

a first rotor having an insulating ferromagnetic layer and a first conductive layer, said first rotor being fixed to one of said first and second shafts at a predetermined position in an axial direction of said one of the first and second shafts, a stationary core having two exciting coils arranged in an axial direction of a rotation axis of said rotor with a predetermined space between, and a core body for holding said exciting coils, said stationary core being fixed to a stationary member, a second rotor having a second conductive layer, said second rotor being fixed to the other of said first and second shafts and arranged between said first rotor and said stationary core, and oscillation means for producing an oscillating signal of a particular frequency, said oscillation means being electrically connected to each of said exciting coils, wherein said rotation sensor further comprises variation detecting means for detecting a variation in impedance of each of said two exciting coils due to eddy currents induced in said first and second rotors, difference detecting means for detecting a difference in the detected amount of variation in impedance between said two exciting coils, and determining means for determining a relative rotation angle based on the detected difference, wherein said first conductive layer of said first rotor is provided on said insulating ferromagnetic layer, on at least one of the opposite sides of said first rotor as viewed in the axial direction of said rotation axis, and consists of a plurality of portions arranged in a circumferential direction of said first rotor with predetermined spaces between, said stationary core is so arranged that said core body holding said two exciting coils is symmetrical with respect to a plane normal to said rotation axis, and said second conductive layer of said second rotor is provided on an outer circumferential surface of said second rotor and consists of a plurality of portions arranged in a circumferential direction of said second rotor with spaces between, said spaces between the portions of said second conductive layer corresponding to the spaces between the portions of said first conductive layer.

2. The rotation sensor according to claim 1, wherein said stationary core comprises a shielding case capable of blocking an ac magnetic field, and said core body is held in said shielding case.

3. The rotation sensor according to claim 2, wherein said shielding case is formed of aluminum, silver or iron.

4. The rotation sensor according to claim 1, wherein said insulating ferromagnetic layer is made of insulating ferromagnetic material that is a mixture of electrical-insulating thermoplastic synthetic resin and 10 to 70 volume % of powder of soft magnetic material.

5. The rotation sensor according to claim 4, wherein said thermoplastic synthetic resin is any of nylon, polypropylene, polyphenylsulfide and ABS resin.

6. The rotation sensor according to claim 4, wherein said soft magnetic material is Ni—Zn ferrite or Mn—Zn ferrite.

7. The rotation sensor according to claim 1, wherein said first and second conductive layers are formed of copper, aluminum or silver.

8. The sensor of claim 1, wherein the first conductive layer is about 0.1 to 0.5 nm.

9. The sensor of claim 1, wherein the first rotor has an outer circumference that is substantially equidistant to an axis of rotation of the first rotor.

10. A rotation sensor for detecting a rotation angle of a rotating shaft, comprising:

a rotor having an insulating ferromagnetic layer and a first conductive layer provided to cover said insulating ferromagnetic layer in a range corresponding to a center angle of 180°, said rotor being fixed to said rotating shaft, a stationary core having two exciting coils arranged in an axial direction of a rotation axis of said rotor with a predetermined space between, a core body for holding said exciting coils, and a second conductive layer provided on at least one of the opposite sides of said stationary core as viewed in the axial direction of said rotation axis to cover at least one of said exciting coils and a corresponding portion of said core body in a range corresponding to a center angle of 180°, said stationary core being fixed to a stationary member in a manner that said core body holding said exciting cores is symmetrical with respect to a plane normal to said rotation axis, oscillation means for producing an oscillating signal of a particular frequency, said oscillation means being electrically connected to each of said exciting coils, variation detecting means for detecting a variation in impedance of each of said two exciting coils due to eddy currents induced in said rotor, difference detecting means for detecting a difference in the detected amount of variation in impedance between said two exciting coils, and determining means for determining a rotation angle based on the detected difference.

11. The rotation sensor according to claim 10, wherein said stationary core comprises a shielding case for holding said core body.

12. The rotation sensor according to claim 11, wherein said shielding case is formed of aluminum, silver or iron.

13. The rotation sensor according to claim 10, wherein said insulating ferromagnetic layer is made of insulating ferromagnetic material that is a mixture of electrical-insulating thermoplastic synthetic resin and 10 to 70 volume % of powder of soft magnetic material.

14. The rotation sensor according to claim 13, wherein said thermoplastic synthetic resin is any of nylon, polypropylene, polyphenylsulfide and ABS resin.

15. The rotation sensor according to claim 13, wherein said soft magnetic material is Ni—Zn ferrite or Mn—Zn ferrite.

16. The rotation sensor according to claim 10, wherein said first conductive layer is formed of copper, aluminum or silver.

17. The sensor of claim 10, wherein the first conductive layer is about 0.1 to 0.5 nm.

18. The sensor of claim 10, wherein the rotor has an outer circumference that is substantially equidistant to an axis of rotation of the rotor.

19. A rotation sensor for detecting a relative rotation angle between first and second relatively rotating shafts, comprising:

a first rotor having an insulating ferromagnetic layer and a first conductive layer provided to cover said insulating ferromagnetic layer in a range corresponding to a center angle of 180°, said rotor being fixed to said first rotating shaft;

said first rotor being fixed to one of said first and second shafts at a predetermined position in an axial direction of said one of the first and second shafts;

a stationary core having two exciting coils arranged in an axial direction of a rotation axis of said rotor with a predetermined space between, and a core body for holding said exciting coils, a second conductive layer provided on at least one of the opposite sides of said stationary core as viewed in the axial direction of said rotation axis to cover at least one of said exciting coils and a corresponding portion of said core body in a range corresponding to a center angle of 180°, said stationary core being fixed to a stationary member, in a manner that said core body holding said exciting cores is symmetrical with respect to a plane normal to said rotation axis;

a second rotor having a second conductive layer, said second rotor being fixed to the other of said first and second shafts and arranged between said first rotor and said stationary core;

oscillation means for producing an oscillating signal of a particular frequency, said oscillation means being electrically connected to each of said exciting coils;

variation detecting means for detecting a variation in impedance of each of said two exciting coils due to eddy currents induced in said first and second rotors;

difference detecting means for detecting a difference in the detected amount of variation in impedance between said two exciting coils; determining means for determining a relative rotation angle based on the detected difference, wherein said first conductive layer of said first rotor is provided on said insulating ferromagnetic layer, on at least one of the opposite sides of said first rotor as viewed in the axial direction of said rotation axis, and consists of a plurality of portions arranged in a circumferential direction of said first rotor with predetermined spaces between, wherein said stationary core is so arranged that said core body holding said two exciting coils is symmetrical with respect to a plane normal to said rotation axis, and wherein said second conductive layer of said second rotor is provided on an outer circumferential surface of said second rotor and consists of a plurality of portions arranged in a circumferential direction of said second rotor with spaces between, said spaces between the portions of said second conductive layer corresponding to the spaces between the portions of said first conductive layer.

20. The rotation sensor of claim 19, wherein said stationary core comprises a shielding case capable of blocking an ac magnetic field, and said core body is held in said shielding case.

* * * * *